United States Patent
Bleijendaal

(10) Patent No.: US 7,313,938 B2
(45) Date of Patent: Jan. 1, 2008

(54) BICYCLE LOCK

(76) Inventor: Cornelis Bleijendaal, Eidenrodelaan 97, Amstelveen, NL-1181 DG (NL)

( * ) Notice: Subject to any disclaimer, the term of this patent is extended or adjusted under 35 U.S.C. 154(b) by 0 days.

(21) Appl. No.: 10/547,700

(22) PCT Filed: Mar. 5, 2004

(86) PCT No.: PCT/NL2004/000164

§ 371 (c)(1),
(2), (4) Date: May 22, 2006

(87) PCT Pub. No.: WO2004/078566

PCT Pub. Date: Sep. 16, 2004

(65) Prior Publication Data
US 2007/0012076 A1  Jan. 18, 2007

(30) Foreign Application Priority Data
Mar. 5, 2003  (NL) .................................... 1022848

(51) Int. Cl.
*E05B 71/00* (2006.01)
*B62H 5/00* (2006.01)

(52) U.S. Cl. ......................................... 70/236; 70/233

(58) Field of Classification Search ................. 70/233, 70/236, 234, 235; 280/297
See application file for complete search history.

(56) References Cited

U.S. PATENT DOCUMENTS

| 686,940 | A | * | 11/1901 | Huscher | 70/236 |
| 704,655 | A | * | 7/1902 | Morgan | 70/236 |
| 947,073 | A | * | 1/1910 | Conta | 70/236 |
| 1,140,751 | A | * | 5/1915 | Leksuczin | 70/236 |
| 2,055,149 | A | * | 9/1936 | Hershbain | 70/233 |
| 4,284,290 | A | * | 8/1981 | Ragsdale | 70/236 |
| 4,841,757 | A | * | 6/1989 | Guthrie | 70/236 |

FOREIGN PATENT DOCUMENTS

| EP | 0630802 | 12/1994 |
| NL | 9201644 | 4/1994 |

* cited by examiner

Primary Examiner—Suzanne Dino Barrett
Assistant Examiner—Christopher Boswell
(74) Attorney, Agent, or Firm—Shoemaker and Mattare

(57) ABSTRACT

A bicycle lock for blocking a rotation of the crankshaft (5) of a bicycle is provided at the bottom in a saddle tube (6) of the bicycle close to the crankshaft. The bicycle lock comprises a lock housing (1) accommodating a locking pin (2) and a locking mechanism. The locking mechanism is adapted to fix the locking pin in two positions, wherein it releases or blocks the crankshaft. The bicycle lock is provided with coupling means (12) which are adapted to interact with counter-coupling means being part of the saddle tube in order to have a detachable coupling between the lock housing and the saddle tube. The lock housing (1) is coupled to the saddle tube (6) by a rotating coupling (12). The locking pin in the lower position thereof blocks the rotation of the coupling between the block housing and the saddle tube.

14 Claims, 4 Drawing Sheets

BICYCLE LOCK

The invention relates to a bicycle lock for blocking a rotation of the crankshaft of a bicycle, the bicycle lock being provided at the bottom in a saddle tube of the bicycle close to the crankshaft, the bicycle lock comprising a lock housing accommodating a locking pin and a locking mechanism, the locking mechanism being adapted to be operated by a key to be inserted through a hole in the saddle tube, the locking mechanism being adapted to fix the locking pin in two positions, wherein the locking pin in an upper position thereof releases the crankshaft and in a lower position thereof blocks the crankshaft, an end of the locking pin in the lower position thereof engaging a matching notch in the crankshaft.

The prevention of theft of bicycles has resulted in a large number of patent applications which have all been classified in the IPC classes B 62 H 5/00 regarding accessories and built-in bicycle locks, B 62 H 5/08 regarding features to prevent riding and B 62 H 5/10 regarding features which act on a pedal crank. EP-A-0 630 802 describes a lock which acts on the crankshaft. Locks of the type as described in the above-mentioned European patent application are not or hardly applied due to the complexity of the assembly and maintenance or due to the restrictions in replacement options without jeopardising the quality of the blocking of the crankshaft.

The object of the invention is to provide a replaceable bicycle lock which blocks the crankshaft.

To reach this object, the invention provides a bicycle lock of the type as mentioned in the preamble, the bicycle lock being provided with coupling means which are adapted to interact with counter-coupling means being part of the saddle tube in order to have a detachable coupling between the lock housing and the saddle tube, the lock housing being coupled to the saddle tube by a rotating coupling, the locking pin in the lower position thereof blocking the rotation of the coupling between the lock housing and the saddle tube.

The bicycle lock according to the invention can therefore be placed as a complete unit in the saddle tube of a bicycle and rotated into position through, for example, a threaded connection, a V-groove connection or a bayonet connection at the bottom in the saddle tube, the connection also being secured when the bicycle lock is locked with the key and the locking pin of the bicycle lock catches in a matching notch in the crankshaft, so that the bicycle lock cannot be removed from the saddle tube when the bicycle is locked. On the other hand the bicycle lock can be rotated, disconnected and removed in its entirety when the bicycle is not locked. This solution makes it possible to apply locks on crankshafts, while retaining the quality requirements with regard to adequate maintenance, or the possibility of replacing the bicycle lock if the lock does not function adequately.

It must be noted that the bicycle lock can also be applied on bicycles which are provided with a so-called closed crankshaft, wherein the crankshaft is surrounded by a cylindrical protective element. It is clear that in this case the protective element has a lead-through opening for part of the locking pin.

In the following, the invention is explained in greater detail on the basis of the enclosed drawings, which are in no way intended to restrict the extent of protection, but merely to show possible embodiments.

FIG. 1 schematically shows a section of a part of bicycle frame at the bicycle lock according to the invention.

In the different Figures, the same reference numerals indicate the same or similar parts.

Figures 1, 2, 3:
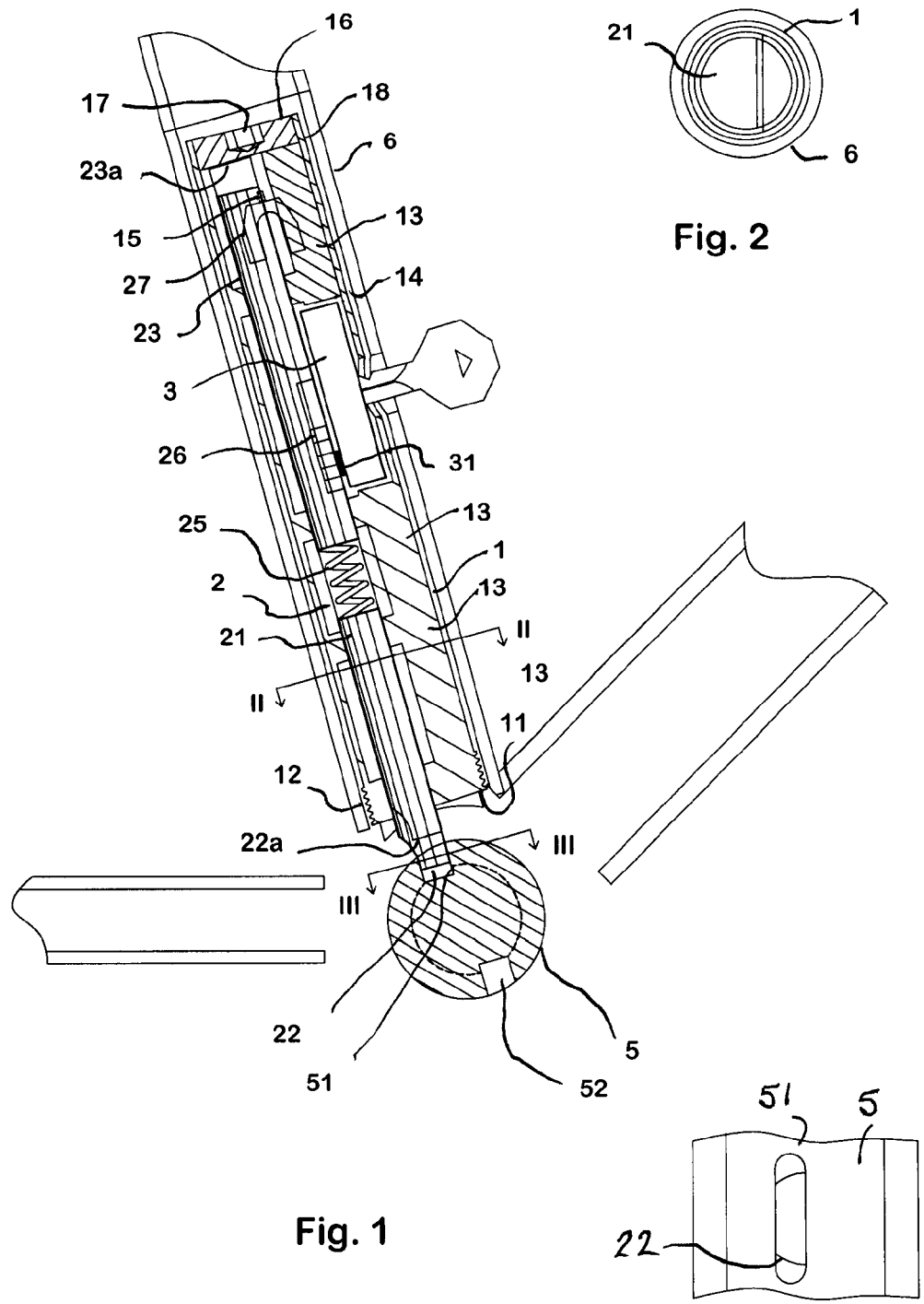
FIG. 2 shows a section II-II just above a base plate of the bicycle lock according to FIG. 1.
FIG. 3 shows a section III-III according to FIG. 1 on the level of the end of the locking pin in the crankshaft.

As shown by FIGS. 1, 2 and 3, the bicycle lock according to the invention comprises a lock housing 1 in which a locking pin 2 is positioned. The locking pin 2 consists of two parts, that is to say, a bottom part 21 and a top part 23, which are coupled to each other through a spring element 25. The locking pin 2 can be placed in two positions by means of lock mechanism 3 and key 4, being a lower position in which the locking pin 2 blocks the crankshaft 5 of a bicycle, represented by a thick line showing the locking pin in FIG. 1, the lower end 22 of the locking or lower part 21 of the locking pin 2 catching in one of two matching notches 51 or 52 of crankshaft 5, and an upper position in which the locking pin 2 is placed back in the lock housing 1, represented by the positions of ends 22a and 23a of the locking pin 2 indicated by a thin line in FIG. 1. The spring element 25 of the locking pin 2 enables locking of the bicycle without one of the matching notches 51 of 52 being exactly positioned before the end 22 of the locking pin 2. If there is a sufficient rotation of crankshaft 5, the end 22 of the bottom part 21 of the locking pin 2 will be pressed in one of the matching notches 51 of 52 by the pressure force generated in spring element 25, when one of the notches 51 or 52 is positioned before the end 22.

Generally speaking, one or more notches may be used in the crankshaft 5. Each notch may take the form of a blind hole or a groove or any other suitable form. In case of a groove, the bottom of the groove may extend in line with the longitudinal axis or the locking pin, when the locking pin is in its lower position blocking the rotation of the crankshaft. The shape and number of the notches may be determined by the mechanical strength required in the crankshaft to perform its normal function, and to prevent theft of the bicycle by breaking the crankshaft, when the locking pin engages the crankshaft.

The lock mechanism 3 moves the locking pin 2 with a gearing or eccentric 31, in accordance with the applied lock mechanism 3, via a structure 26 prepared for this purpose to top part 23 of locking pin 2.

The top part 23 of the locking pin 2 can also be fitted with a catch system 27 for mounting a connector of a cable bicycle lock through an opening in the side of the saddle tube 6, so that the bicycle can also be tied to a street object with the same lock.

The lock housing 1 has a base plate 11 with a threaded, V-groove or bayonet system 12. The lock housing 1 comprises a number of guides 13 for guiding the locking pin 2, a space 14 for the lock mechanism 3 as well as an insert 15 for reinforcing the lock housing 1, or for possible support of a catch system 27 for fitting a cable bicycle lock in cooperation with the top part 23 of the locking pin 2 at a possible opening in the side of the saddle tube 6. The lock housing 1 includes a closing plate 16 which has a hexagonal hole 17 for a socket-head wrench, or an engagement structure for a special tool for assembly or disassembly of the lock housing 1, as well as an attachment 18 between the closing plate 16 and the lock housing 1 which is secured in such a way that it cannot be released if the lock housing 1 is fixed or released in the saddle tube 6. The lock housing 1 is placed in a crankshaft casing at the bottom in the saddle tube 6 by means of the threaded connection or V-groove connection or bayonet connection 12 in such a way that the distance between the bottom side of base plate 11 of the lock housing 1 and the crankshaft 5 is as small as possible, so that the distance to be bridged by the locking pin 2 to the crankshaft 5 is as small as possible, with the aim to give the blocking of the crankshaft 5 the best possible mechanical strength. Furthermore, the lock housing 1 is secured against the releasing rotation of the lock housing 1 in the connection 12 at the bottom in the saddle tube 6 by the eccentric arrangement of locking pin 2 in the lock housing 1.

The crankshaft 5 is provided with one or more milled tangentially matching notches, FIG. 1 showing two notches 51 and 52. These tangentially matching notches 51 and 52 are axially bounded as shown for notch 51 in FIG. 3, with the aim of preventing that the bicycle can be released from the bicycle lock by opening a crankshaft house and removing crankshaft 5 outwards in an axial direction. This possibility is prevented by the indicated limited space of the tangentially matching notches 51 and 52.

Furthermore, it is indicated in FIG. 3 that the end 22 of the locking pin 2 has been ground in such a way that a more or less trapezium-shaped section is obtained which catches in the milled tangentially matching notch 51 in such a way that also by this composition of pin 22 and space 51 the releasing of the lock housing 1 by rotation has become impossible.

The forms, materials and dimensions of the various components that are part of the invention can be varied within reasonable bounds, the section of locking pin 2 may be sector-shaped as shown in the Figures, but it is also possible to choose a trapezium-shaped, rectangular, square or even circular section if the locking pin 2 is fitted in the lock housing 1 eccentrically.

Moreover, it is also possible to have a design with a concentrically applied locking pin, if the pin has a trapezium-shaped, rectangular, square or hexagonal section (FIGS. 6, 7, 8 and 9 respectively) that catches in a similarly shaped notch in the crankshaft. This may also help to secure the bicycle lock when the bicycle is locked.

It is also possible to freely choose the applied connection between lock housing 1 on the one hand and the saddle tube 6 with the crankshaft casing on the other hand, under the condition that a rotation, however small, is required for the assembly and disassembly of the lock housing 1 at the bottom in the saddle tube 6 in order to make the securing possible through locking pin 2 when the bicycle is locked.

Figure 4:
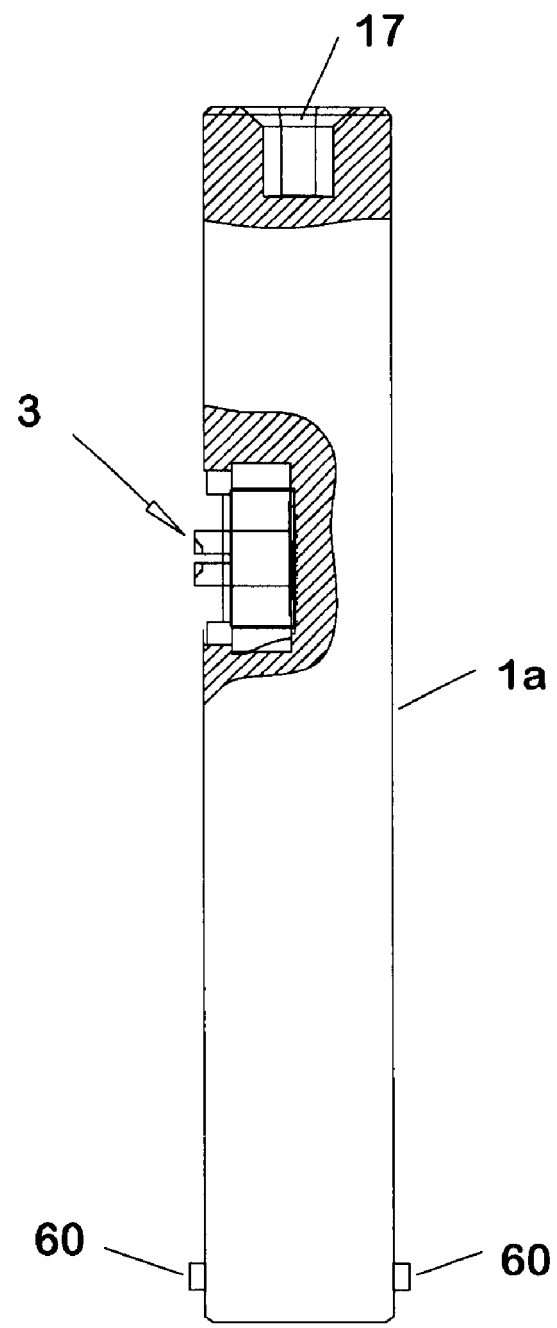
FIG. 4 shows a side view, partially cut-away, of an embodiment of the bicycle lock according to the invention for an bayonet coupling of the lock housing to a saddle tube.

FIG. 4 shows a bicycle lock comprising a lock housing 1a which at a bottom end thereof is provided with one or more radially outwardly extending pins 60. A saddle tube 6 (not shown) shaped in conformity with this embodiment comprises at least one ridge extending radially and at least partially circumferentially along the inner wall of the saddle tube 6 at the bottom thereof. The lock housing 1a is mounted in the saddle tube 6 by lowering the at least one pin 60 to below the level of the ridge in the saddle tube 6, and rotating the at least one pin 60 through an angle such that the at least one pin 60 is situated below the ridge, thereby preventing a removal of the lock housing 1a from the saddle tube 6 in an axial direction, in particular when the locking pin 2 (not shown) of the bicycle lock in the lower position thereof blocks a rotation of the lock housing 1a in the saddle tube 6.

It is to be noted that the at least one pin 60 may also be spring-loaded to be able to press the pin 60 into the lock housing 1a, whereby the pin 60 does not extend from the lock housing 1a. With such a construction, said ridge may extend fully circumferentially along the inner wall of the saddle tube 6, and may take the form of a collar. During mounting of the lock housing 1a, the at least one pin 60 may be pressed inwardly by a suitable tool until the at least one pin 60 has passed the ridge or collar, after which the at least one pin 60 is released to block a movement of the lock housing 1a in the reverse direction.

The lock housings 1, 1a according to the invention may be press fitted into the saddle tube 6, in addition to their rotational coupling to the saddle tube 6.

Figure 5:
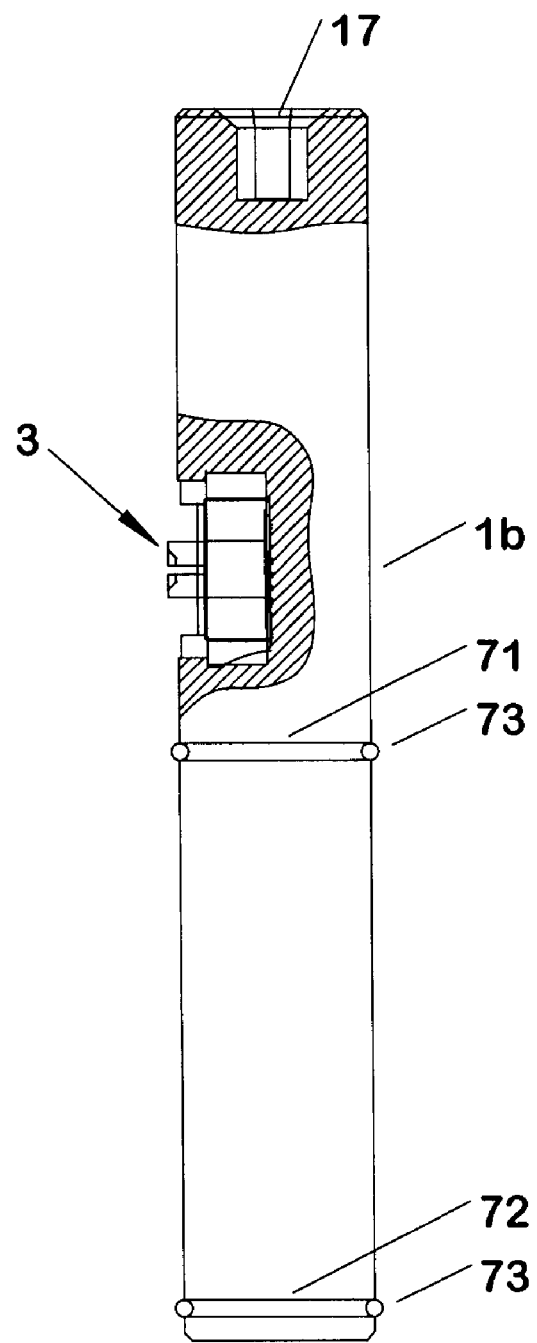
FIG. 5 shows a side view, partially cut-away, of an embodiment of a bicycle lock to be glued in a saddle tube.
Figure 6:
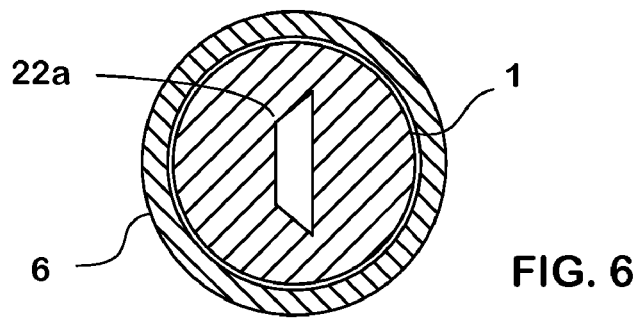
FIGS. 6, 7, 8 and 9 are sectional views showing alternative non-circular locking pin shapes.
Figure 7:
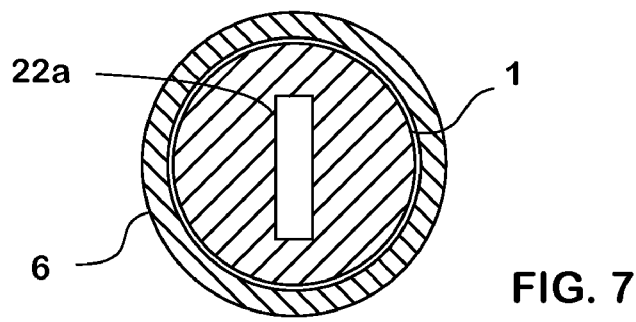
Figure 8:
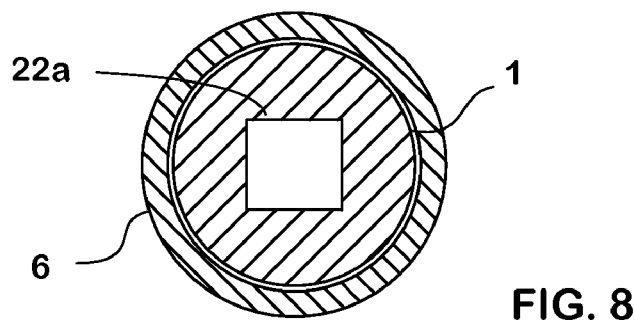
Figure 9:
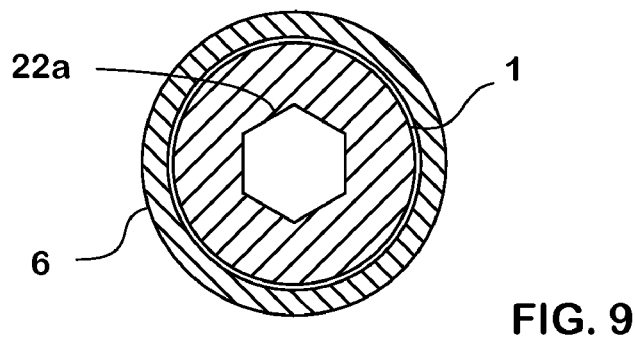

FIG. 5 shows a lock housing 1b being provided with a first circumferential groove 71 below the lock mechanism 3 and a second circumferential groove 72 below the lock mechanism 3. The grooves are spaced apart from each other. Groove 72 is situated near an end of the lock housing 1b, whereas groove 71 is situated near the lock mechanism 3. In each groove 71, 72 an O-ring 73 is provided. The outer diameter of the O-rings 73 substantially equals the inner diameter of the saddle tube 6 (not shown). The saddle tube 6 is provided with a key hole for inserting a key into lock mechanism 3. The lock housing 1b is mounted by sliding it down into the saddle tube 6 until the area between the O-rings 73 is situated opposite to the key hole in the saddle tube 6. Next, the space enclosed by the outer wall of the lock housing 1b between the O-rings 73, the inner wall of the saddle tube 6 opposite to the outer wall of the lock housing 1b, and the O-rings 73 is filled with a suitable glue through the key hole in the saddle tube. Advantageously, when filling said space with glue, the O-ring 73 in the groove 71 is situated just above, or at the level of the key hole, in order to be able to apply a maximum amount of glue to obtain a most secure fixing of the lock housing 1b in the saddle tube 6 when the glue has hardened. After filling said space with glue, the lock housing 1b is brought into position while the glue still permits movement of the lock housing 1b. This embodiment and procedure solves the problem of simply and reliably applying glue inside a saddle tube for glueing a lock housing in a saddle tube in a predetermined position, and at the same time preventing the glue to contaminate the lock housing or disturbing the functioning of the bicycle lock. After hardening of the glue, the bicycle lock cannot be removed from the saddle tube without irreparibly damaging the frame of the bicycle.

Instead of two O-rings 73 in combination with the grooves 71 and 72, respectively, only one O-ring 73 in combination with groove 72 can also be used, omitting the O-ring 73 and the groove 71.

In view of a possible centring function of an O-ring and groove combination for centring the lock housing 1b in a saddle tube, this function may also be obtained by other means being situated at a distance from the O-ring 73 in groove 72.

Instead of a combination of an O-ring and groove, also another resilient or non-resilient sealing member may be used, which is glued to, or otherwise connected with the lock housing 1b, or which may be integrally formed therewith.

The bicycle lock according to the invention is not restricted to the construction example shown in the drawings and as described above. It is possible to introduce variations in several ways within the scope of the invention. E.g., for a further theft protection, a steel ball (not shown) may be accommodated in the upper part of the lock housing to prevent a destruction of the bicycle lock by drilling into the lock housing from above through the saddle tube. The steel ball diverts the tip of the drill laterally, and thus protects the lower parts of the lock housing.

The bicycle lock according to the invention is not restricted in its use in other situations or applications.

The invention claimed is:

1. Bicycle lock for blocking rotation of the crankshaft of a bicycle, the bicycle lock being provided at the bottom in a saddle tube of the bicycle close to the crankshaft, the bicycle lock comprising
    a lock housing accommodating a locking pin and a locking mechanism, the locking mechanism being adapted to be operated by a key to be inserted through a hole in the saddle tube, the locking mechanism being adapted to fix the locking pin in either of two positions, wherein the locking pin in an upper position thereof releases the crankshaft and in a lower position thereof blocks the crankshaft, an end of the locking pin in the lower position thereof engaging a matching notch in the crankshaft,
    the lock housing being coupled to the saddle tube by a rotating coupling, the locking pin in the lower position thereof having a nonrotable engagement with said matching notch, thus blocking rotation of the lock housing and preventing it from being removed from the saddle tube.

2. Bicycle lock according to claim 1, wherein the A rotary coupling is a threaded connection.

3. Bicycle lock according to claim 1, wherein the rotary coupling is a bayonet connection.

4. Bicycle lock according to claim 1, wherein the lock housing is fitted in the saddle tube by means of a V-groove connection.

5. Bicycle lock according to claim 1, wherein the locking pin has an eccentric position in the lock housing.

6. Bicycle lock according to claim 5, wherein the lower end of the locking pin is cylinder-shaped and catches in a cylinder-shaped notch in the crankshaft.

7. Bicycle lock according to claim 1, wherein the section of the lower end of the locking pin is trapezium-shaped.

8. Bicycle lock according to claim 1, wherein the section of the lower end of the locking pin is rectangular.

9. Bicycle lock according to claim 8, wherein the section of the lower end of the locking pin is square.

10. Bicycle lock according to claim 1, wherein the section of the lower end of the locking pin is hexagonal.

11. Bicycle lock according to claim 1, wherein the locking pin comprises two parts which are coupled to each other through a spring element.

12. Bicycle lock according to claim 1, wherein the lock mechanism is a cross lock.

13. Bicycle lock according to claim 1, wherein the lock mechanism is a cylinder lock.

14. Bicycle lock according to claim 1, wherein the bicycle lock also includes a catch system for fitting a cable bicycle lock.

* * * * *